W. P. KENNEDY 2,780,488

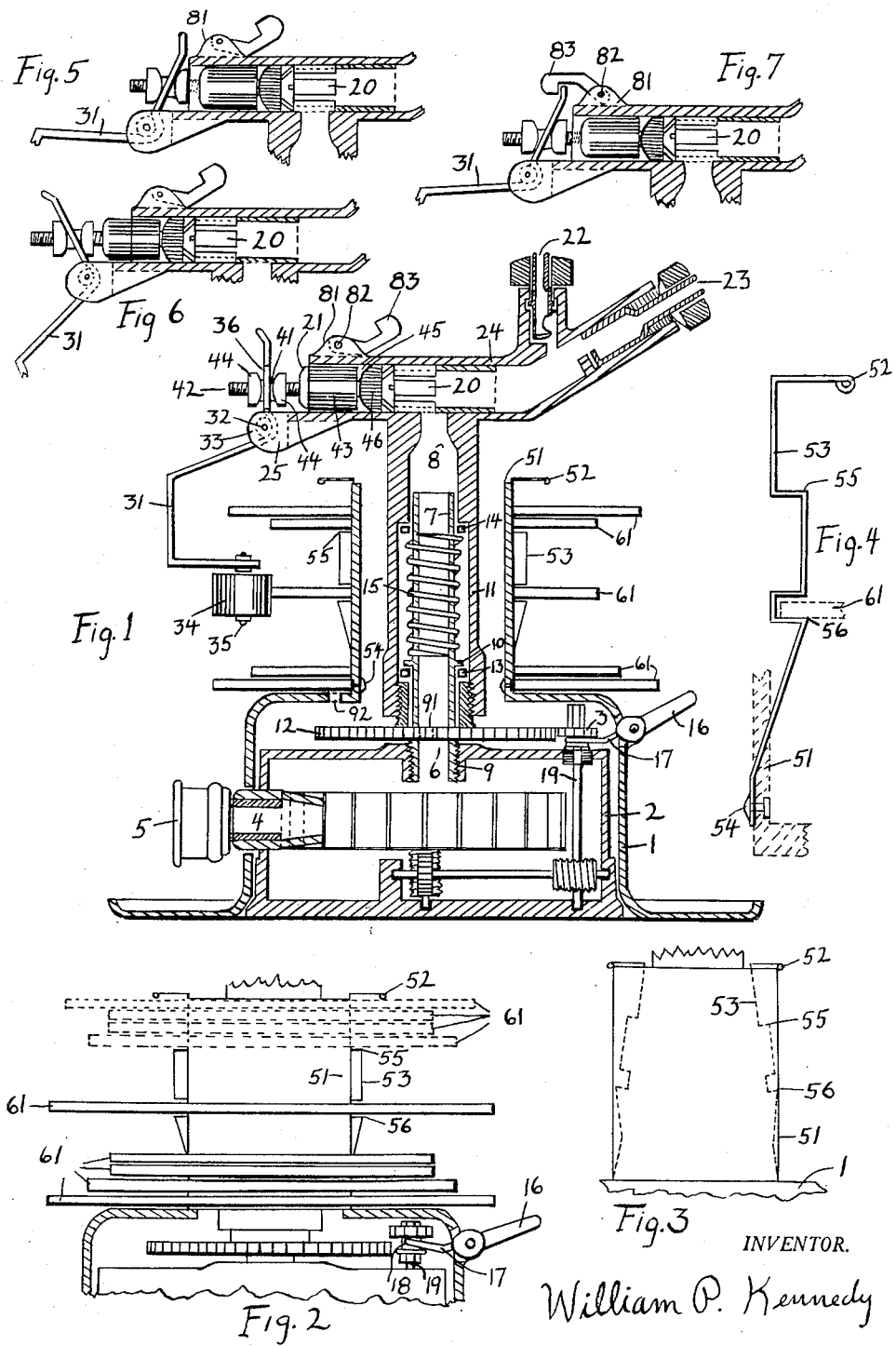
Feb. 5, 1957  W. P. KENNEDY  2,780,488
ADJUSTABLE PATTERN IRRIGATION SPRINKLING DEVICE
Filed Aug. 4, 1955  3 Sheets-Sheet 1
INVENTOR.
William P. Kennedy Feb. 5, 1957 W. P. KENNEDY 2,780,488
ADJUSTABLE PATTERN IRRIGATION SPRINKLING DEVICE
Filed Aug. 4, 1955 3 Sheets-Sheet 2
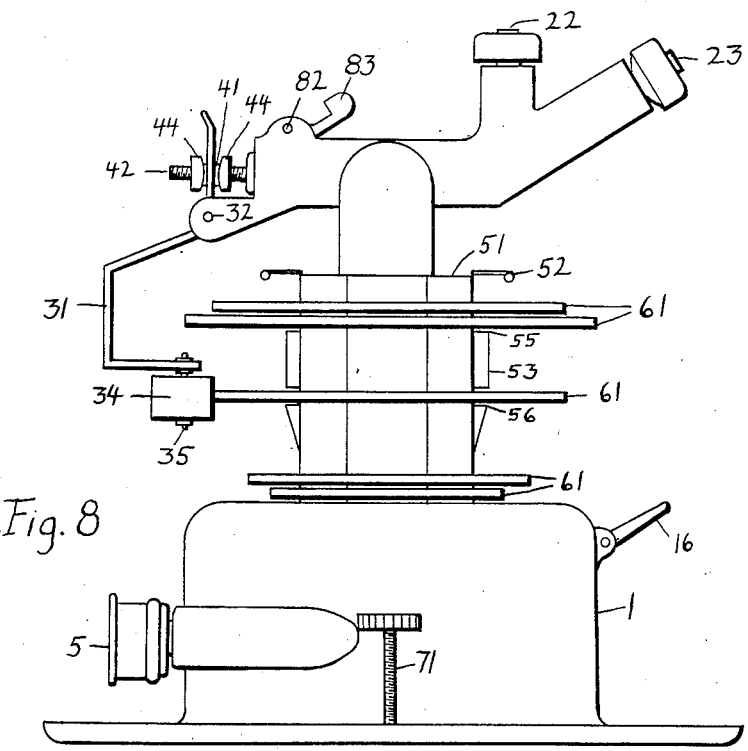
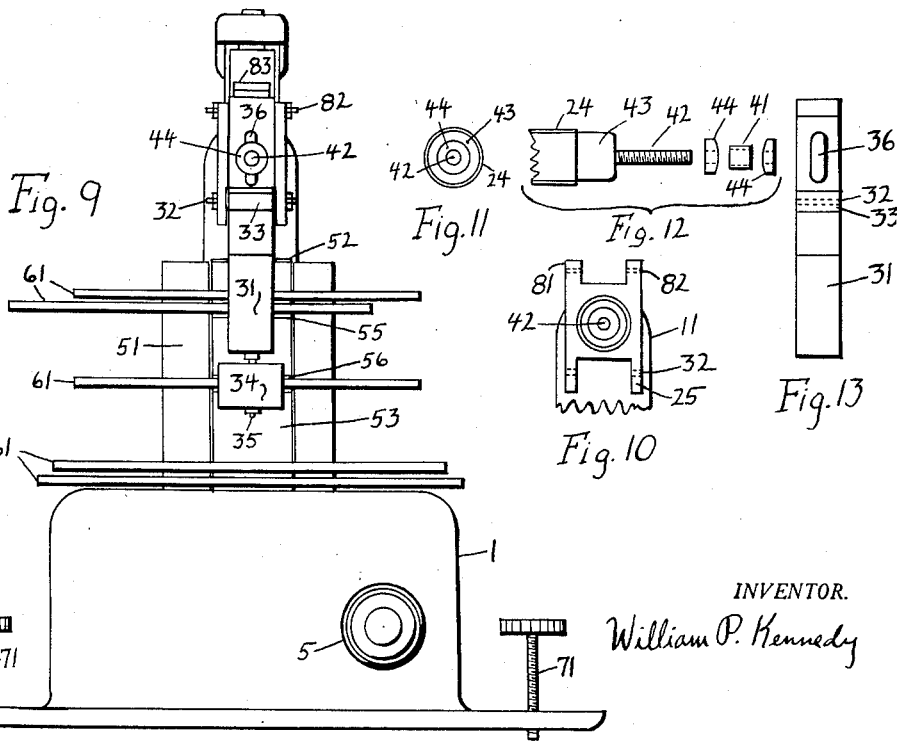
INVENTOR.
William P. Kennedy Feb. 5, 1957

ADJUSTABLE PATTERN IRRIGATION SPRINKLING DEVICE

Filed Aug. 4, 1955

INVENTOR.

William P. Kennedy

United States Patent Office 2,780,488
Patented Feb. 5, 1957

2,780,488
ADJUSTABLE PATTERN IRRIGATION SPRINKLING DEVICE

William P. Kennedy, Marietta, Ga.

Application August 4, 1955, Serial No. 526,500

13 Claims. (Cl. 299—18)

This invention relates to irrigation sprinkling devices and is particularly concerned with adjustable pattern sprinkling devices which may be readily adjusted by the user to sprinkle not only the usual circle but also squares, rectangles, triangles, and other polygons, as well as ellipses, clover-leaf, L-shaped, and other patterns that would approximate more area conditions than the usual circular or present pattern sprinklers are capable of forming.

While numerous and various types of sprinkling devices have been designed and many are available on the market, the circular sprinklers are well known for their deficiencies as far as meeting coverage requirements of the usual area shapes encountered by the user, circular areas being practically nonexistent in plot layout. The over-lapping of sprinkled areas, as well as watering undesired areas, in attempting to irrigate any shape other than a circle with this type device is apparent.

A number of sprinkling devices have been designed to overcome the pattern deficiencies of circular sprinklers but, for the most part, they are designed to sprinkle one shape only, usually a square, and in the few that sprinkle more than one pattern it requires considerable adjustment, even to dismantling and reassembling the device to change the pattern.

Other deficiencies of present pattern sprinklers are the unusual and cumbersome design of such devices, departing greatly from a recognizable sprinkling device, such departure being confusing to the prospective purchaser; lack of provision for moving the device from one location to another without physical damage to the device, especially to the gearing; lack of means for affixing the device to the ground to prevent displacement of the sprinkler and thereby altering the pattern; and the use of intricate and delicate mechanism thereby making the device expensive and easily subject to damage.

In accordance therewith, it is among the primary objects of the present invention to provide a novel, simple and improved sprinkling device which will provide multiple sprinkle patterns, the more standard shapes provided as a part of the device, provision made whereby the user can make and use other patterns specific to his various needs, with said patterns being easily and quickly changed when mounted on the device and the device is being used to irrigate the various shaped areas.

Another object of the invention is to provide a pattern sprinkler that is enough like most rotary sprinklers in appearance so as to be readily identified as a sprinkling device by a prospective purchaser at a glance.

A further object of the invention is to provide a pattern sprinkling device that can be moved from one location to another, even with the attendant dragging of the attached supply hose, without damage to the device.

It is another object of the invention to provide a device of the character set forth in which the shape of the pattern control devices are of a shape conforming with the shape of the area to be irrigated, with all the pattern control devices that are mounted upon the sprinkler constantly visible and readily identifiable.

It is also an object of the invention to provide a pattern sprinkling device with means for affixing the device to the ground so as to preclude lateral displacement, turning, or other movement that would interfere with constant alignment of the device with the patterned area to be irrigated.

It is also an object of the invention to provide a device of the character set forth that is simple, rugged and durable, easily repaired, of compact size and shape, and designed to meet the needs of economic manufacture.

Numerous other objects, features, and advantages of the present structure will be apparent from the consideration of the following specification taken in conjunction with the accompanying drawings, in which:

Fig. 1 is a vertical sectional view of a side position of the device.

Fig. 2 is a fragmentary sectional view of a portion of Fig. 1 showing further the means for positioning pattern plates and also shifting of the control drive gear.

Fig. 3 is a reduced scale fragmentary sectional view of a portion of Fig. 2 showing the releasing mechanism for positioning pattern plates.

Fig. 4 is an enlarged scale fragmentary sectional view of Fig. 3 showing in more detail one of the spring clips for positioning pattern plates.

Figs. 5, 6, and 7 are fragmentary views of a portion of Fig. 1 showing the valve mechanism in three stages of movement.

Fig. 8 is a surface elevation of Fig. 1.

Fig. 9 is a rear view of the device in surface elevation.

Fig. 10 is a fragmentary view of a portion of Fig. 9 showing the rear of the valve cylinder, unobstructed by other parts of the device.

Fig. 11 is a portion of Fig. 10 showing the rear of the valve piston.

Fig. 12 is an exploded view of the side rear of the valve piston and cylinder showing the means for adjustable linkage.

Fig. 13 is a view of a portion of Fig. 9 showing the rear of the lever, unobstructed by other parts.

Figure 14:
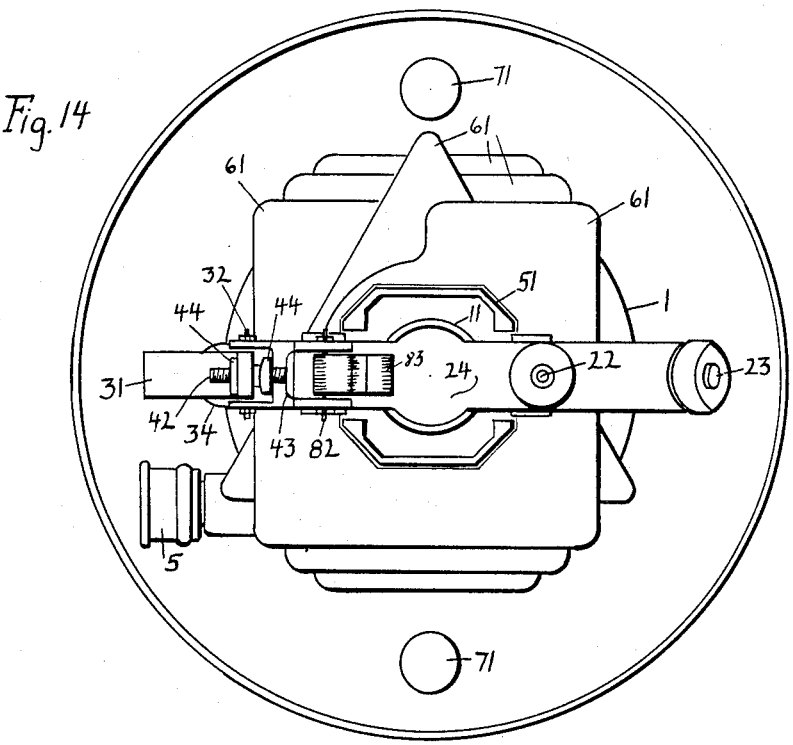
Figure 15:
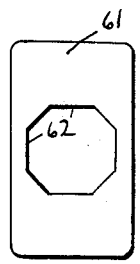
Figure 16:
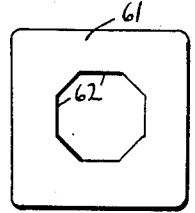
Figure 17:
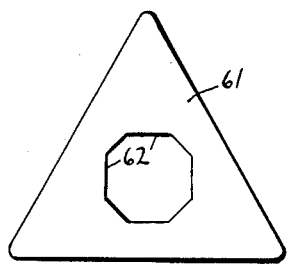
Figure 18:
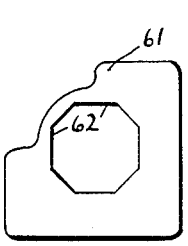
Figure 19:
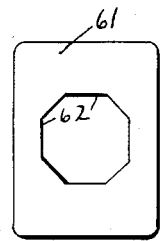

Fig. 14 is a surface plan view of the device.

Figs. 15, 16, 17, 18, and 19 are plan views, in reduced size, of the pattern plates shown in Fig. 14.

Figure 20:
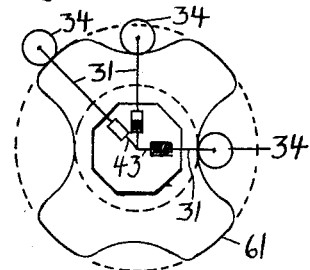
Figure 21:
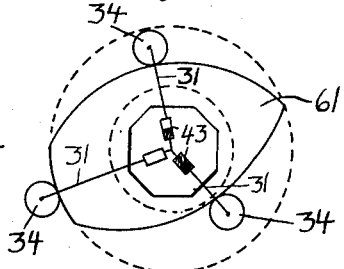

Figs. 20 and 21 are views of two of the innumerable possible specific area designs that could be made for definite area conditions, and also illustrate symbolically the basic principle of this device forming patterns.

Referring to the drawings, the numeral 1 designates the supporting body of the device in which is mounted a maximum flow water motor 2 provided with reduction gears to reduce the speed of the final gear 3 of the water motor greatly in comparison with the speed of the water wheel and hence a great increase in power. No claim is made for features of the water motor of which there are models on the market with which upon some rearrangement of parts would be satisfactory for powering this device. The water flow entering the water motor at 4 through the standard hose connection at 5 would exit the motor at 6 and travel through a hollow rigid lugged standard 7 of suitable size, to the chamber at 8. This standard is threadedly connected to the water motor 2 at 9 and has a circumferential lug at 10 to hold the rotating sprinkler lower casing 11 to the standard 7. Threadedly connected to the casing 11 is a large gear 12 that meshes with gear 3 and rotates around the standard 7. Rotating with gear movement by gear 3 the assembly 11 and 12 are provided with friction and water sealing washers 13 and 14 and an expanding spring 15 to insure proper contact at washers 13 and 14.

To avoid damage to the gearing of this device when moving it from one location to another by grasping it by the top, means for shifting gear 3 out of engagement with gear 12 is provided at the level 16, by which gear 3 may be moved either into or out of engagement with gear 12 by vertical adjustment of the lever 16 which in turn moves the attached yoke 17 which is in slideable connection with an integral, flanged collar 18 on the bottom of gear 3, the collar and it's attached gear being capable of sliding on axle 19 but prevented from turning around axle 19 by means of integral longitudinal ribs on the gear extremity of the axle 19.

The water in chamber 8 travels through the ports 20 in a sliding valve assembly 21 to the two adjustable orifices 22 and 23 for distribution to the area to be irrigated. Each of these orifices may be opened entirely or closed entirely or set at any volume between these points individually. It is apparent that entirely closing both orifices would prevent both flow and revolving action, so either or both should be set at least partially open for operation depending on object desired. On the same basis, the valve itself is not so closely fitted as to shut the water flow off entirely when in closed position but would pass enough water to keep the water motor in operation, a good ratio being about one-fourth the full flow when in closed position.

The stem body 24 is a part of the casing body 11 and moves therewith. As the stem body revolves around the axis of the standard 7, a pivotally mounted lever 31 travels with it. This lever 31 is pivotally mounted to the ears 25 of the stem 24 with a bolt 32 through the ears 25 and an axle housing 33 on the lever 31. On the lower end of the lever 31 is a rotatable mounted wheel 34 which is freely rotative around the axle 35 which is rigidly fastened to the lever 31. At the upper end of the lever 31 is a vertical slot 36, freely moving in which is a tubular washer 41. This washer 41 is slideably mounted on a threaded stem 42 of the guiding piston 43 of the valve assembly 21. This valve assembly 21 slides easily either forward or backward in the cylinder 45 of the stem 24, the movement activated by the movement forward or backward of the lever 31. The connection of the lever 31 at the slot 36 on the tubular washer 41 on the threaded stem 42 is effected by front and rear threaded nuts 44, either of which may be adjusted for proper action. Water is prevented from escaping rearwards in the cylinder 45 by the cupped washer 46. At the front end of the valve assembly 21 directly in front of the ports 20 the circumference of the port member is solid from ports to its extremity, which is a sufficient distance to completely cover the upper orifice of chamber 8 thereby acting as a valve. The forward and backward movement of the valve assembly 21, activated by the movement of the lever 31 will open and close this valve action, it being noted as stated heretofore that at fully closed a portion of the water flow will continue to pass. The action of the valve mechanism is shown in more detail in Fig. 5 which shows the valve fully open, and in Fig. 6 which shows the valve fully closed.

The upper portion of the supporting body 1 consists of plate stationing member 51, generally octagonal in plan and of a sufficient height to properly station pattern forming plates 61, which are flat, rigid plates of an outside shape and in reduced size to conform with the outside shape and size of the spray area pattern desired. Change of plate is effected by pressing toward each other the finger surfaces 52 of the two formed spring plate holders 53, which are fastened only at their lower ends to the stationing member 51 with a suitable fastener 54, which has the effect of putting the projecting sides of the holder 53 out of projection into the interior of the stationing member 51 and allowing vertical movement of the individual plates. A shoulder on the holder 53 at 55 will hold such plates as are above the operating plate, and formed groove on the holder 53 at 56 will hold the operating plate firmly in vertical position, the plates out of action below resting on the top of the supporting body 1. Any of the plates on the device can be positioned in the grooves 56 with the balance of the plates being either above or below, out of action, as shown in Fig. 2. The result of compressing the spring plate holders 53 is shown in Fig. 3. An enlarged detail of the holder 53 is shown in Fig. 4.

The pattern plates 61 are of a suitable material, size, and rigidity for their purpose, with their outer edge to conform with the shape and size of the pattern of the area to be sprinkled. The beginning shape of a plate 61 would be a circle with it's diameter a dimension sufficient to extend the wheel 34 end of the lever 31 far enough outward so as to move the slotted end 36 of the lever 31, on the opposite side of the pivot point 32, inward a sufficient distance to move the valve assembly 21 to the fully open position. This would provide the greatest volume and throw of water capable of the device and would be the maximum diameter of both pattern plate and spraying area. Then by graduating the diameter of the plate 61 from the maximum to the minimum diameter, at which point the diameter of the plate 61 would be small enough to permit the wheel end 34 of the lever 31 to move inward to this small diameter position thereby moving the slotted end 36 outward which would move the valve assembly 21 to the relatively closed position. The pressure of the water against the inside face of the valve piston assembly exerts a constant force when the device is in operation which keeps the wheel 34 in constant contact with the perimeter of the pattern plate in use. The diameter of the plate at all its points on its perimeter would have a corresponding effect on the valve position in any of the positions between maximum and minimum flow. In this fashion it would be possible to sprinkle any shaped area within the limitation of this principle, such as squares, triangles, rectangles, L-shaped, elliptical and other figures, so long as their greatest dimension lies within the maximum diameter and their least dimension lies within the minimum diameter of the plate circle adjusted for the limits of the stroke of the valve piston and changes in direction are not too abrupt for easy rounding of such corners on the plate by the wheel 34.

Plates 61, of the usual desired shapes, are shown in reduced scale in Figs. 15, 16, 17, 18 and 19. Each plate has a properly positioned interior opening 62 to fit closely enough to preclude any appreciable movement horizontally around the plate stationing member 51 but loosely enough to permit vertical movement for placement on the member 51 to be held in vertical position by the plate holder 53. A plan view of the device with the usual desired shapes of plates thereon is shown in Fig. 14. The outside or perimeter corners of the plates 61 should be rounded sufficiently to permit easy rounding of these angles by the wheel 34 as shown. The principle of the opening and closing of the valve based on the relative position of the wheel 34 on the perimeter of the plate 61 is shown in Figs. 20 and 21 which also shows two of the innumerable shapes that could be made for various patterns of area required. Fig. 20 being perhaps a flower border and Fig. 21 being perhaps a center plot of a driveway turning circle.

On the top rear end of the stem 24 is a pair of integral lugs 81 with opposed holes for an axle 82 which holds a lever retaining catch 83 which when in open position as shown in Figs. 1, 5, and 6 permits the lever 31 its full movement thereby permitting a pattern controlled by the plates 61. To form a spray pattern of a true circle, a pattern plate is not needed but is accomplished by the device by the placing of the lever 31 to the full open lever position and the retaining catch 83 placed over the upper end of the lever 31 as shown in Fig. 7, thereby locking the lever 31 in open position and hence the device would form a true circle in pattern. Due to the slow revolving of the distribution head, this sprinkler waters a circle of considerably greater diameter than the usual rotary sprinkler.

By means of the orifice valves 22 and 23 the outside area of a selected pattern could be sprayed without sprinkling the inside area of the figure. This could be accomplished by adjustment of the orifice valves. The amount of water placed in these two areas could be also adjusted in any ratio by this means.

To preclude turning horizontally or lateral displacement of the supporting body 1 of the device and thereby altering the set pattern being used, two threaded spikes 71 with a hand movable turning flange on the top ends are shown, which may be projected a distance downward as needed to engage the particular surface conditions upon which the device is placed, or the spikes may be retracted entirely to put them out of operation.

In the event the use of other than standard area shaped plates 61 is desired, or for any other reason, removal of pattern plates from the supporting body of the device is effected by the manual alignment of a suitable hole 91 in gear 12 with a suitable matching hole 92 in the supporting body 1, then placing a suitable rigid shaft through both holes which would preclude movement of the gear 12 in relation to the supporting body 1 thereby enabling the lower casing 11 and its stem 24 to be removed by unscrewing same from the threaded portion of gear 12 thereby permitting the plates 61 to be removed from the device.

In the practice of the invention, it will be understood that the device is not limited to the specific structural details and arrangements herein presented but that numerous changes, modifications and the full use of equivalents may be resorted to in the practice of the invention without departing from the spirit or scope of the appended claims. It will be further understood that while the invention as herein set forth presents various structural features which may be independently operable and may function for securing various advantageous features, such elements of the invention may be separately used and may be combined other than as here presented.

I claim:

1. A rotary sprinkler, including a supporting body, a reduction geared water motor, a hollow supporting standard with a piston valved, rotary distribution head thereon, said head rotated by action of said geared water motor, with means for activating said piston valve by means of a pivoted lever with a rotary wheel on one extremity of said lever, a plurality of pattern controlling plates selectively moveably mounted on said supporting body, said wheel being in contact perimetrically with any one of said pattern controlling plates, so as to form any one of a multiplicity of area spray patterns.

2. In a device of the character described, including a supporting body, a reduction geared water motor, a hollow supporting standard with a piston valved rotary distribution head thereon, a multiplicity of horizontal pattern controlling plates selectively moveably mounted upon said supporting body, said head rotated by action of said geared water motor and said valve activated by a lever, one end of which is in perimetrically moveable contact with any one of said pattern controlling plates and means for stationing pattern plates.

3. The device as set forth in claim 2, with means for varying the distribution of spray delivered to the inside or the outside portions of the sprinkled area.

4. The device as set forth in claim 2, with means for keeping the pattern contacting end of the lever assembly in contact with the pattern plate contour perimeter by means of water pressure.

5. The device as set forth in claim 2, with means for fastening the lever assembly out of action in reference to the pattern control plates, the piston valve thereby being held in full open flow position, thereby causing the device to sprinkle a true circular area.

6. The device as set forth in claim 2, with means for adjusting valve action on valve side of lever pivot.

7. The device as set forth in claim 2, with means for compensating for vertical movement of lever at its valve connection.

8. The device as set forth in claim 2, with means for shifting gearing in or out of operation.

9. The device as set forth in claim 2, with means for stationing the device in fixed horizontal relationship to the ground.

10. The device as set forth in claim 2, with retractable means for stationing the device in fixed horizontal relationship to the ground.

11. The device as set forth in claim 2, with retractable means for stationing the device in fixed horizontal relationship to the ground by means of hand operatable threaded bolts.

12. The device as set forth in claim 2, with means for preventing lever contact with any pattern plates out of action.

13. In a device of the character described, including a supporting body, a reduction geared water motor, a hollow supporting standard with a piston valved distribution head thereon, said head rotated by action of said geared water motor and said valve activated by a lever, one end of which is in perimetrically moveable contact with any one of a multiplicity of horizontal pattern controlling plates selectively moveably mounted upon said supporting body, means for stationing pattern plates in vertical adjustment by means of formed spring clips.

References Cited in the file of this patent

UNITED STATES PATENTS

| | | |
|---|---|---|
| 1,637,413 | Elder | Aug. 2, 1927 |
| 2,601,559 | Riblet | June 24, 1952 |
| 2,654,635 | Lazzarini | Oct. 6, 1953 |

FOREIGN PATENTS

| | | |
|---|---|---|
| 289,843 | Great Britain | June 28, 1928 |